United States Patent [19]
Daddario

[11] 4,309,154
[45] Jan. 5, 1982

[54] PUMPS OPERATED BY THE RISE AND FALL OF WATER

[76] Inventor: Francis E. Daddario, 15 Fowler La., Falmouth, Mass. 02450

[21] Appl. No.: 102,221

[22] Filed: Dec. 10, 1979

Related U.S. Application Data

[63] Continuation of Ser. No. 861,686, Dec. 19, 1977, abandoned.

[51] Int. Cl.³ .............................................. F04B 17/00
[52] U.S. Cl. .................................... 417/337; 60/639; 60/496
[58] Field of Search ............... 417/337, 225, 150, 334, 417/329; 60/496, 639, 640

[56] References Cited
U.S. PATENT DOCUMENTS

| | | | |
|---|---|---|---|
| 467,072 | 1/1892 | White | 417/337 |
| 2,129,292 | 9/1938 | Vinson | 417/329 |

FOREIGN PATENT DOCUMENTS 719101  2/1932  France .................................. 60/640

Primary Examiner—Richard E. Gluck

[57] ABSTRACT

A pumping system uses flowing water to operate a pump or pumps intermittently, each pump having a vertically expansible chamber established by piston and cylinder members of which one is fixed and the other float supported. Each pump chamber is filled and expanded to a predetermined extent by flowing water and is discharged, with the water flow interrupted, under a head greater than the flowing water affords. The discharge of the chamber water of each pump may be used for various purposes including the operation of another pump to further increase the head on its chamber water, increase the volume of such water, or both. The head afforded by the flowing water is usually inadequate to effect wanted expansion of a pump chamber only by the delivery of the flowing water thereto and most situations call for each pump being within a reservoir which can be flooded by the flowing water to lift the float to a desired height and later drained.

4 Claims, 4 Drawing Figures

4,309,154

PUMPS OPERATED BY THE RISE AND FALL OF WATER

This is a continuation of application Ser. No. 861,686, filed Dec. 19, 1977, now abandoned.

RELATED APPLICATION

An application filed by applicant on the same date as this application and entitled "Tide Operated Pumps".

BACKGROUND OF THE INVENTION

The typical hydroelectric system requires a large reservoir. At the present time, the construction of a new conventional hydroelectric system would require, for its reservoir, a large number of acres that usually are of substantial value for other purposes. Sites suitable for dam locations along a river are usually few in number and almost always would have a great impact on the overall environment if used for that purpose.

While proposals have been made to utilize tides to operate pumps for use in connection with the generation of electricity, as far as I am aware, it has never been proposed that continuously flowing water or even intermittment run-off water be used intermittently to operate a pump or a series of pumps to provide a discharge of water under a wanted head and thus eliminate the necessity of providing large reservoirs that are now required to produce a wanted operating flow and head.

THE PRESENT INVENTION

The general objective of the present invention is to provide a pumping system utilizing continuously flowing water (a term including run-off water) to provide a wanted output in terms of volume and head without the use of a large reservoir such as is required for the operation of a conventional hydroelectric system.

In accordance with the invention, this objective is attained with the pumping system having at least one pump, the pump provided with piston and cylindr members establishng a vertically expansible chamber with one member fixed and the other member including a float. Valve controlled delivery means enable flowing water to enter the chamber and valve controlled discharge means are operable to permit the chamber water to be discharged for use. Means are also provided to increase the head on the chamber water so that the head on the discharged water is greater than that afforded by the flowing water.

During the interval water is being discharged from a pump, the flowing water may be used to effect the expansion of the chamber of another like pump as often several pumps may be required for each installation, particularly where a continuous discharge is wanted.

Since flowing water is usually incapable of effecting the expansion of the pump chamber or chambers of such pumps when delivered thereto, another objective of the invention is to provide a reservoir for each chamber with the reservoir having means enabling it to be flooded to raise the float and later drained.

An important feature of the invention is that means are provided to increase the head on water entrapped in the pump chambers and this is accomplished by providing that each float may be flooded with ballast water and later drained to reestablish its normal buoyancy. The flooding can be effected in different ways such as by a valve controlled port enabling reservoir water to be entered into a float, by utilizing chamber water, and by a separate valve controlled means operable to deliver flowing water directly into the float.

Another important feature of the invention is that, when the system includes a number of pumps, the floats can be elevated substantial distances above the height to which they can be raised by the flowing water, a result attainable since the chamber water of a pump, once its head is greater than the head on the chamber water of another pump, can be discharged into the chamber of the last named pump and the head thereon so increased that the chamber water may be used to further elevate the float of any other pump thus ensuring a wanted volume of chamber water, a wanted head thereon, or both in excess of that attainable by the head on the flowing water.

Another objective of the invention is to enable the pump operating water to be used efficiently, an objective attained by enabling a turbine to be operated by the reservoir, ballast and chamber waters with the various control valves operated in a desired order.

While the dimensions of the reservoirs and chambers are, of course, related to the wanted energy potential of the system, the reservoirs or chambers are small as compared with the reservoirs of a conventional hydroelectric system and they may be located where land is available and present minimal environmental problems. A plurality of such units may be used to provide a wanted output, continuous operation or both and the pumps and reservoirs may be arranged in series or they may be arranged more or less side-by-side and receive flowing water so that one is being filled while another is draining.

Both the discharge stream from the reservoir and that from the pump chamber are streams that may operate turbines but are also useful for other purposes; for irrigation systems, aeration or cooling of the stream, for pumping water into the chamber of another pump or back into a reservoir, for examples, or for pumping from another source.

Another objective of the present invention is to provide a reservoir that functions as a cylinder and a float that functions as a piston head therewith. By providing the float with means to enable it to be flooded when in an elevated position and later drained, a substantial increase in the head is achieved both on the reservoir water and the water in the chamber.

BRIEF DESCRIPTION OF THE DRAWINGS

In the accompanying drawings, preferred embodiments of the invention are schematically illustrated with FIG. 1 a fragmentary vertical section of a pumping system in accordance with the invention utilizing a single pumping unit.

THE PREFERRED EMBODIMENTS OF THE INVENTION

Figure 1:
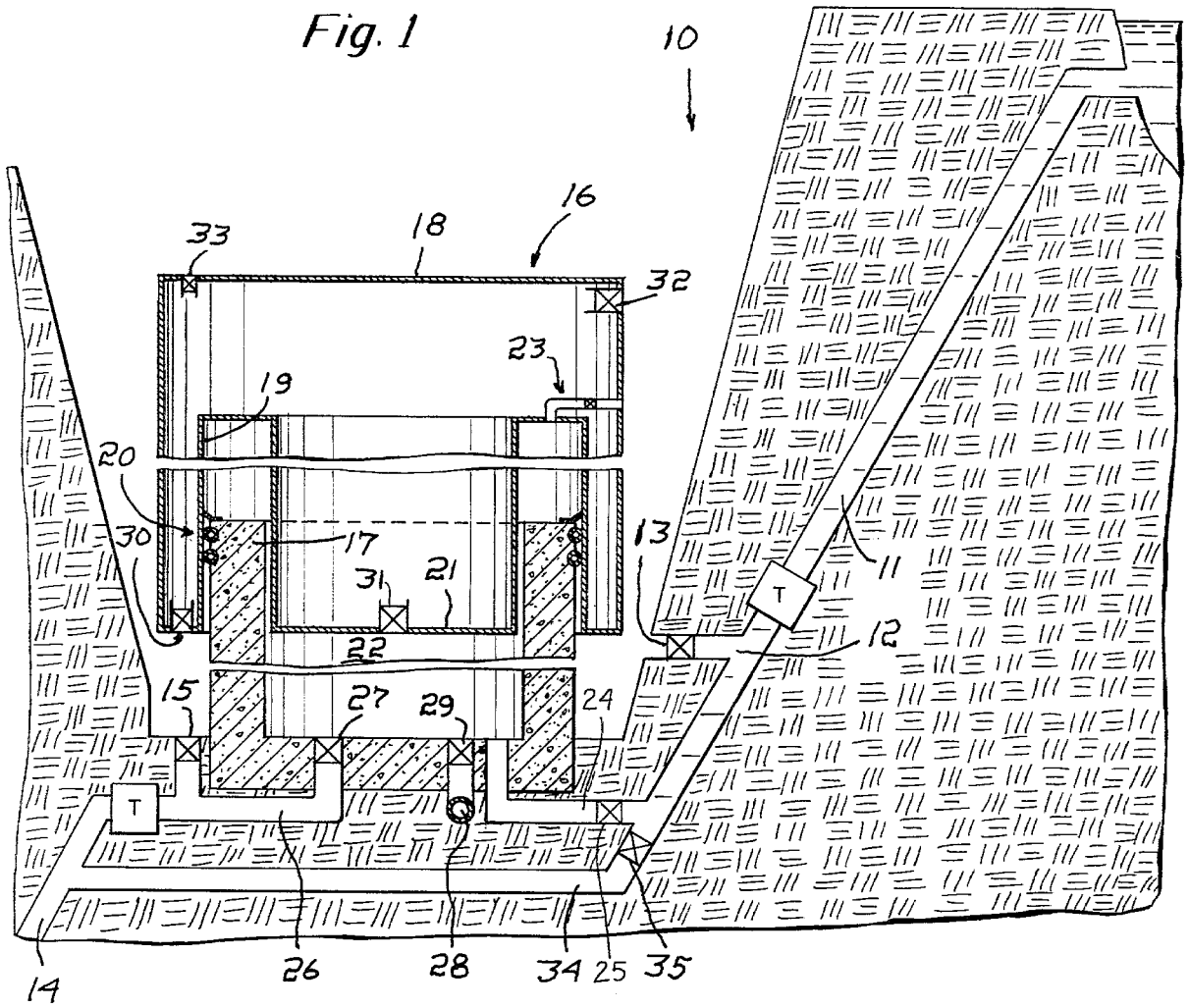

In the embodiment of the invention illustrated by FIG. 1, a reservoir, generally indicated at 10, is located relative to elevational differences along a water stream 11 which, for example, may be a river, a flume, or aqueduct, a distance such that it may be filled to a desired level by water delivered thereto by a conduit 12 provided with a valve 13 (the term "valve", as used herein, means any control used or useable in systems where the flow of large volumes of water must be regulated and the term "conduit" as used herein means both flumes, streams, rivers, and pipes, as in all situations it will be obvious which is to be used) and later drained by a conduit 14 having a valve 15, draining water providing a first discharge stream. The stream 11 may include an upstream lake or reservoir and in FIG. 1 the terrain permits the reservoir 10 to extend below ground. Whether the reservoir extends below ground, above ground, or both depends on elevational differences or heads determining where inlet and outlet conduits must be located. In the case of a slow moving river, for example, either a long inlet conduit, a long outlet or discharge conduit, or both may be required to provide elevational difference appropriate for a particular pumping system.

A pump, generally indicated at 16, is within the reservoir 10 and is of the type having a fixed vertical member and a float held thereby for vertical movement relative thereto, the float and the support having piston and cylinder portions providing a vertically expansible pump chamber. The piston and cylinder portions and floats may be of any wanted cross sectional shape. The pump has as its vertical member and upwardly opening cylinder 17 of any desired cross sectional size and shape and the float 18 as having a cylinder portion 19 shaped and dimensioned to receive the wall of the cylinder 17 which is shown as having sealing means generally indicated at 20. The float 18 has a piston 21 entrant of the cylinder 17 and defining therewith a vertically expansible chamber 22. The float 18 also has a valve controlled air relief 23 in communication with the upper end of the cylinder 19.

A second conduit 24, under the control of a valve 25, connects the stream 11 with the chamber 22 through the support. An outlet conduit 26 provided with a valve 27 connects the chamber 22 to the conduit 14 which is shown as delivering water to a turbine T from which the water may be returned to the river or to another reservoir and the pump therein. A second outlet conduit 28 under the control of a valve 29 is for use in effecting communication with the chamber 22 of another pump when its valve 29 is open or with another water source.

The float 18 is essentially a tank for ballast water which may be recieved or discharged through a port in the bottom of the float 18 and provided with a valve 30 and it may also be received and discharged through a port in the bottom of the piston 21 and provided with a valve 31 and can be used to introduce ballast water only if the introduction of such water will not cause the float to sink prematurely. The float 18 has a port adjacent its upper end controlled by a valve 32 which may be a check valve and an air relief port in its upper end and provided with a valve 33.

The stream 11 may itself be capable of operating a turbine such as the turbine T located in the stream 11 above the conduits 12 and 24 and it may include a conduit 34 provided with a valve 35. The conduit 34 may be a bypass, as in the present case, or used to deliver water to another reservoir, the pump therein, or both, as two or more pumps may be required to ensure continuous operation.

A preferred mode of operation is to have, first, the valves 13 and 25 open, and the air relief 23 open only under conditions to release air from the upper end of the cylinder 19 of the float and all other valves closed, the flowing water filling the reservoir 10 to a predetermined level and raising the float 18 to expand and fill the pump chamber 22 to a corresponding extent. The valve 25 is then closed to trap the water in the chamber 22, the valve 13 is left open, if desired, and the valves 30, 32, and 33 opened thus to effect the flooding of the float 18 with ballast water to a wanted extent. The air relief 23 is operated to prevent the flow of water in either direction through it.

The valve 13 is now closed and the valve 15 is then opened to deliver reservoir water to the turbine T, if desired, or discharged for other use and, when the reservoir 10 is drained the valve 15 is closed and the valve 27 is then opened to utilize the chamber water to operate the turbine and, finally, the valves 30 and 31 are also opened and the valve 15 again opened to drain the float and restore its normal buoyancy and to continue the operation of the turbine. All the then open valves are closed and the valves 13 and 25 again opened to start another pumping cycle. It should be noted that without flooding the float 18, the head on the chamber is increased when the reservoir 10 is drained. It should also be noted that the pump 16 is capable of being operated as a suction pump with only the valve 13 initially opened to elevate the float and then to open the valve 29 in installations where the conduit 28 is in communication with another water source which may be below the level of the bottom of the reservoir 10. In that case, the valves are operated to fill the reservoir 10 so that with only the chamber valve 29, the pump functions as a suction pump.

In the embodiment of the invention illustrated by FIG. 2, two pumps, which are generally similar to that just described except as subsequently noted, are provided with their reservoirs 10A arranged side-by-side below the power house 36 of a conventional hydroelectric system to receive flowing water therefrom and located at one side of a river 37. A flume 38, carrying water discharged through the power house turbine (not shown) is provided with two gates 13A and two gates 25A, the gates 13A in control of the two conduits 12A opening into the reservoirs 10A and the gates 25A in control of the conduit 24A of the pumping units 16A. The flume water may be directed into first one reservoir 10A and then the other with the delivery of flume water into the pumping units separately controlled. The valve controlled outlet conduits 14A are both in communication with a turbine T.

As thus far described, the pump 16A may be quite similar to the pump 16 although each may be of different dimensions and their pistons and cylinders are dimensioned so that their chambers may be expanded vertically a distance substantially greater than effected by the fillings of their reservoirs 10A. In FIG. 2, the conduit 28 interconnects the pump chambers of the two pumps, so that with the valves 29A open water can be discharged from one pump to another pump with the chamber water of said one pump under a sufficiently greater head to effect such delivery thus further expanding the chamber of the pump receiving the water and further elevating the float thereof and providing greater head, volume, or both. In FIG. 2 the conduit 28A, effecting communication between the chambers 22A is provided with a control valve 29A at each end between which there is a central conduit 39 controlled by a valve 40 and in communication, for example, with a turbine T located to discharge water above the dam 41. There may of course be an additional like pump or pumps and their associated reservoirs with any such pump and reservoir arranged either beside or downstream from the two pumps shown.

Figure 2:
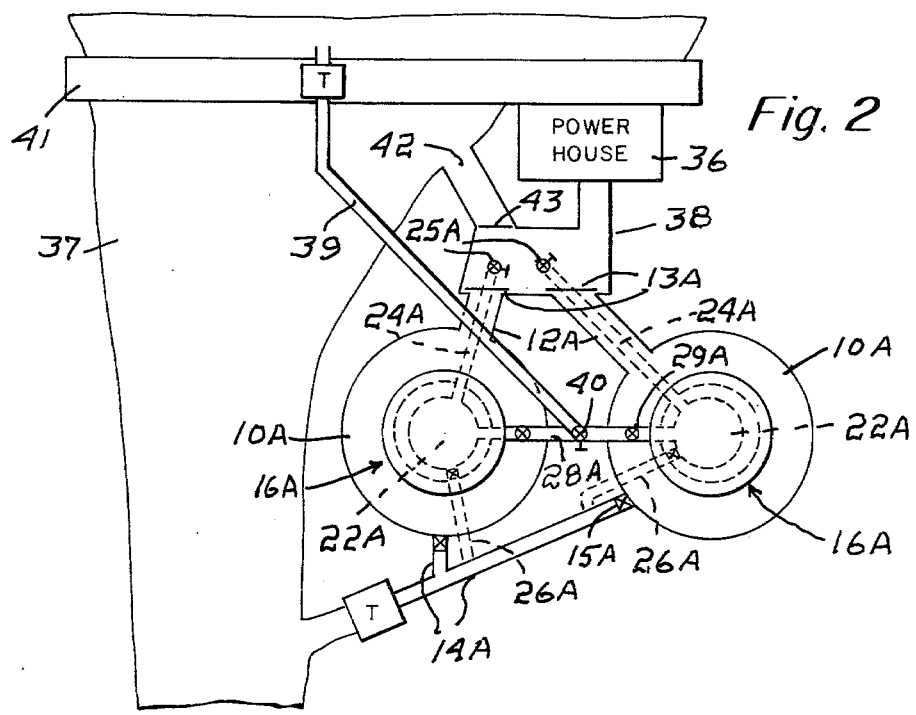
FIG. 2 is a plan view of a pumping system utilizing side-by-side pumping units with the system combined with a conventional hydroelectric plant.

In FIG. 2, it is assumed that the reservoirs 10A and the pumps 16A may also be filled by the river water below the dam 41 and, accordingly, a conduit 42, provided with a gate 43 is positioned to receive such water and deliver it into the flume 38.

Figure 3:
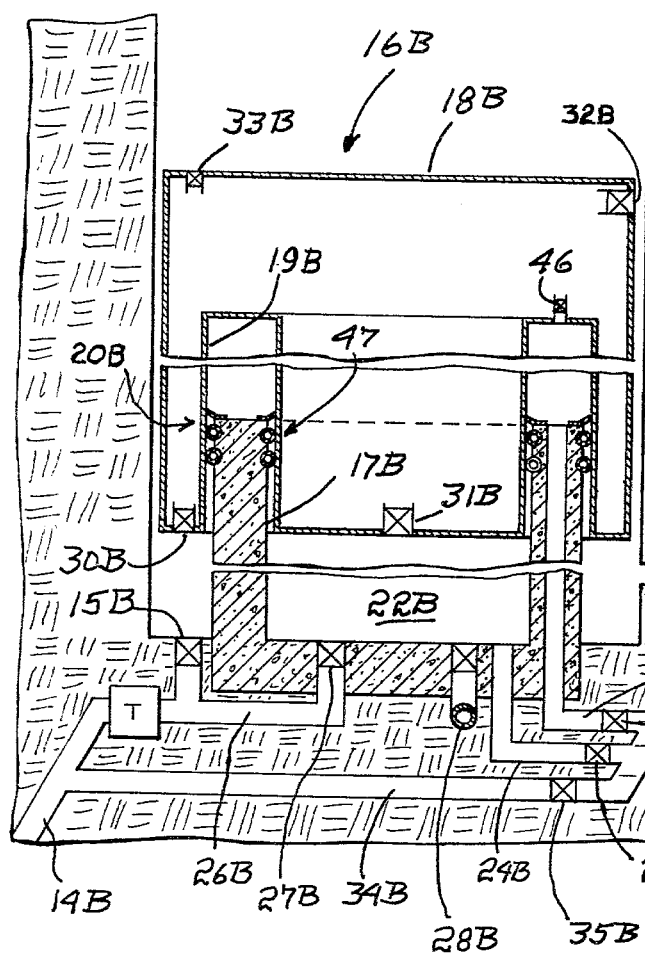
FIG. 3 is a view similar to FIG. 1 but illustrating a modification thereof.

The embodiment of the invention illustrated by FIG. 3 is a modification of the pumping system described in connection with FIGS. 1 and 2, and accordingly, only its different features will be described with the parts that correspond to those shown in FIG. 1 identified by the same reference numerals but distinguished by the suffix addition "B". The sides of the reservoir 10B are vertical.

An important feature of this embodiment is that flowing water may be used directly to deliver ballast water into the float 18B of the pump 16B. To that end, a conduit 44 provided with a valve 45 is provided to deliver water upwardly through the upper end of the wall of the cylinder 17B from the conduit 11B. The cylinder, float and reservoir may be of any desired cross sectional shape. The air relief 23 is replaced by a valve 46 operable to enable such water to be discharged into the float 18B for ballast purposes and this necessitates that the clearance between the piston portion 21B and the inner surface of the wall 17B be sealed and sealing means for that purposes are indicated generally at 47.

Figure 4:
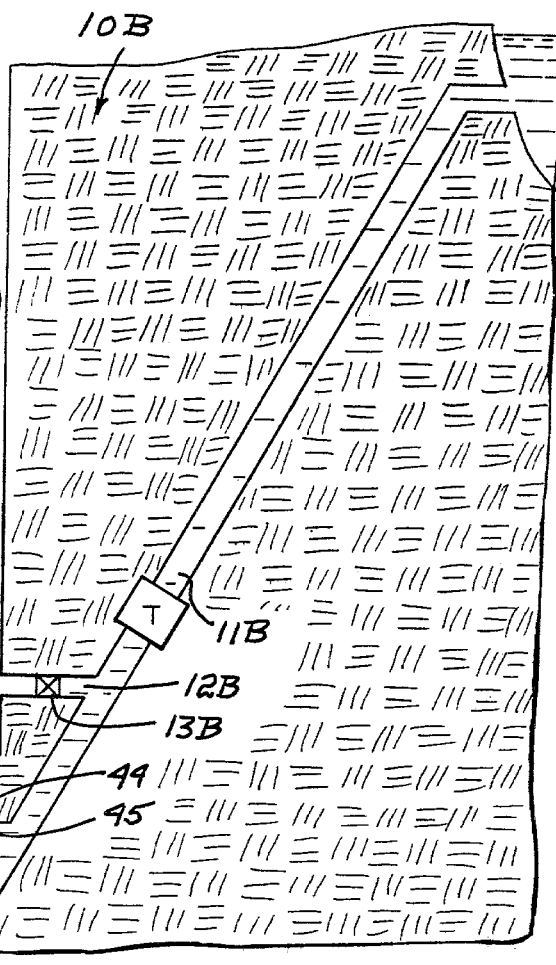
FIG. 4 is a fragmentary vertical section of a pumping unit in accordance with yet another embodiment of the invention.
Figure 4:
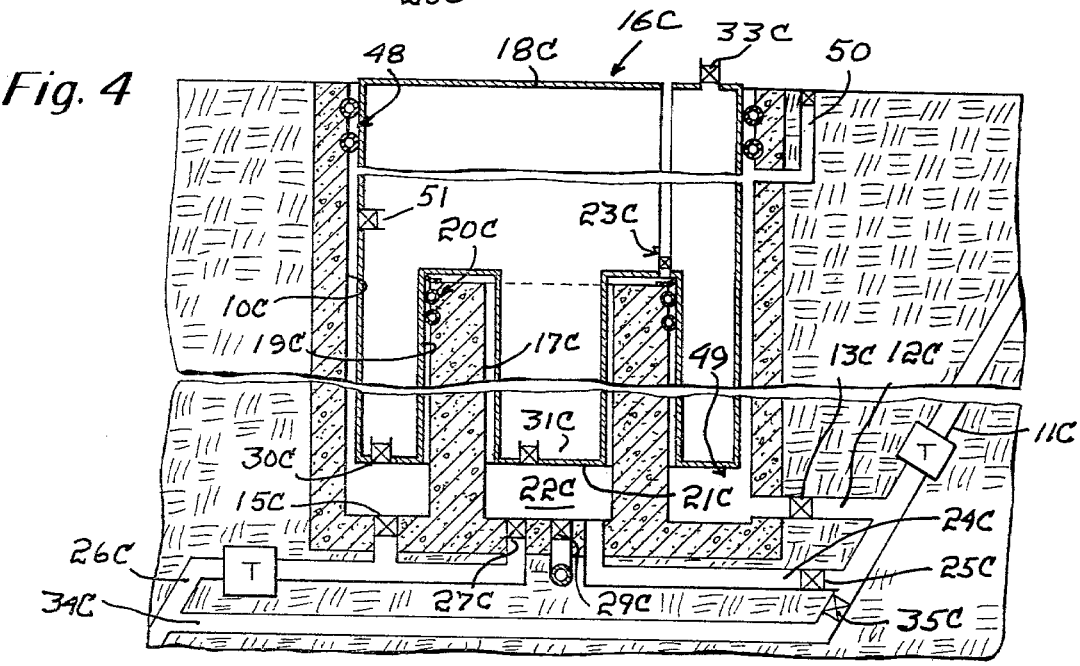

In FIG. 4, a somewhat different pump 16C is shown but corresponding parts will not again be described and are distinguished by the suffix addition "C" to the appropriate reference numerals. The reservoir 10C is or may be cylindrical and the float 18C is of the same cross sectional shape and has sealing means 48 so that the float 18C may function as a piston head whereby it and the reservoir 10C constitute a second pump with the space between it and the cylinder 17C a second pump chamber 49. A valve controlled air relief 50 is in communication with the reservoir 10C below the sealing means 48 and the float 18C has a valve controlled port 51 a substantial distance above the cylinder 19C for use in flooding the float.

As the present invention is concerned primarily with the general features of the pumps and reservoir and these are shown only on a schematic basis, sealing means are not detailed nor are the valves, means to control the valves in a desired order, or such structural details as those enabling components to be serviced.

From the foregoing, it will be apparent that, in the case of any embodiment of the invention, the float of any pump may be flooded, the float of a pump raised by the filling of the reservoir, the chamber water entrapped therein and later discharged under the head established by the weight of the float which may be increased by the introduction of ballast water.

Any pump with a head on its chamber water greater than that existing on the water in the chamber of another pump may be discharged into the last named chamber further to expand it vertically. In a system including a plurality of pumps and reservoirs (usually more than the two shown in FIG. 2) enough water may be accumulated so that on the appropriate operation of valves, the continuous operation of a turbine or turbines may be assured with a desired volume of water under a required head.

I claim:

1. A pumping system to be operated by flowing water from an elevated source, said system including at least one pump, said pump including a piston and a fixed cylinder establishing a vertically expansible chamber, said piston including a float, a reservoir in which the pump is located, a first valve controlled delivery conduit communicating between the reservoir and the elevated source of flowing water to thereby enable the reservoir to be flooded in order to raise the float from a first position and expand said chamber, a valve controlled discharge conduit communicating the bottom of the reservoir with a lower level conduit to affect drainage thereof and thereby lower the float and contract the chamber, a second valve controlled delivery conduit entering the bottom of the chamber and communicating with the elevated source of flowing water, a second valve controlled discharge conduit in communication with the bottom of said chamber and connected to a turbine, said valves being operated to admit water into the reservoir to raise said float and admit water into the chamber, then said valves being operated to drain the reservoir and discharge water from the chamber, said float further including valve controlled means operable to admit ballast water when the reservoir is flooded in order to increase the head on the chamber, and then drain said ballast water when the float is in said first position.

2. The pumping system of claim 1 in which there is an additional like pump having a pump chamber and an additional valve controlled conduit in communication with the pump chambers.

3. The pumping system of claim 1 in which the float includes second valve controlled means operable to effect communication between the chamber and the interior of the float.

4. The pumping system of claim 1 in which there is an additional valve controlled discharge conduit in communication with the pump chamber.

* * * * *